US012043046B2

(12) United States Patent
Milini

(10) Patent No.: US 12,043,046 B2
(45) Date of Patent: Jul. 23, 2024

(54) DIGITAL PRINTING AND FINISHING METHOD FOR FABRICS AND THE LIKE

(71) Applicant: Luigi Milini, Saronno (IT)

(72) Inventor: Luigi Milini, Saronno (IT)

(73) Assignee: Dover Europe Sàrl, Vernier (CH)

( * ) Notice: Subject to any disclaimer, the term of this patent is extended or adjusted under 35 U.S.C. 154(b) by 434 days.

(21) Appl. No.: 17/090,514

(22) Filed: Nov. 5, 2020

(65) Prior Publication Data

US 2021/0053369 A1 Feb. 25, 2021

Related U.S. Application Data

(63) Continuation of application No. 15/214,037, filed on Jul. 19, 2016, now abandoned, which is a continuation of application No. 13/988,108, filed as application No. PCT/EP2011/067162 on Sep. 30, 2011, now abandoned.

(30) Foreign Application Priority Data

Nov. 24, 2010 (IT) .......................... MI2010A002176

(51) Int. Cl.

| | |
|---|---|
| ***B41J 3/407*** | (2006.01) |
| ***B41J 2/14*** | (2006.01) |
| ***B41J 11/00*** | (2006.01) |
| ***B41J 15/04*** | (2006.01) |
| ***D06B 1/00*** | (2006.01) |
| ***D06B 1/02*** | (2006.01) |

(52) U.S. Cl.

CPC ......... *B41J 3/4078* (2013.01); *B41J 2/14201* (2013.01); *B41J 11/0015* (2013.01); *B41J 11/002* (2013.01); *B41J 11/0022* (2021.01); *B41J 11/007* (2013.01); *B41J 15/048* (2013.01); *D06B 1/00* (2013.01); *D06B 1/02* (2013.01)

(58) Field of Classification Search

CPC .. D06B 1/00; D06B 1/02; B41J 3/4078; B41J 11/0015; B41J 11/002; B41J 11/007; B41J 2/14201; B41J 15/048

See application file for complete search history.

(56) References Cited

U.S. PATENT DOCUMENTS

| | | | | |
|---|---|---|---|---|
| 3,659,767 | A | 5/1972 | Martin | |
| 4,707,546 | A * | 11/1987 | Niwa | C09B 62/085 534/635 |
| 5,345,863 | A | 9/1994 | Kurata et al. | |
| 6,027,195 | A | 2/2000 | Gauthier et al. | |
| 6,059,391 | A * | 5/2000 | Fulkerson | B41J 11/06 68/205 R |
| 6,068,362 | A | 5/2000 | Dunand et al. | |
| 6,199,614 | B1 | 3/2001 | Snyder | |
| 6,467,898 | B2 | 10/2002 | Codos et al. | |
| 7,585,039 | B2 | 9/2009 | Ochiai et al. | |
| 7,618,119 | B2 | 11/2009 | Shibata et al. | |
| 2002/0054781 | A1 | 5/2002 | Korem | |
| 2003/0214554 | A1* | 11/2003 | Tschida | B41J 11/42 347/42 |
| 2004/0179077 | A1* | 9/2004 | Samii | B41J 11/0005 347/101 |
| 2005/0106355 | A1* | 5/2005 | Kohlman | D06Q 1/06 68/12.07 |
| 2006/0033796 | A1 | 2/2006 | Samii et al. | |
| 2006/0098035 | A1 | 5/2006 | Matz et al. | |
| 2006/0132575 | A1* | 6/2006 | Fukuda | B41J 3/4078 347/104 |
| 2007/0040879 | A1 | 2/2007 | Chung | |
| 2009/0293209 | A1 | 12/2009 | Chung | |
| 2013/0232746 | A1 | 9/2013 | Milini | |
| 2016/0325560 | A1 | 11/2016 | Milini | |

FOREIGN PATENT DOCUMENTS

| | | |
|---|---|---|
| BR | 0414631 | 11/2006 |
| BR | 0819358 | 5/2009 |
| BR | 112013012608 | 8/2016 |
| BR | 112013012832 | 8/2016 |
| BR | 112013012848 | 8/2016 |
| BR | 112013013155 | 8/2016 |
| BR | 112013012616 | 9/2016 |
| BR | 112013012999 | 9/2016 |

(Continued)

OTHER PUBLICATIONS

CN Office Action in Chinese Appln. No. 201810750581.9, dated Mar. 12, 2021, 21 pages (with English Translation).

"Cloth feeding device for woven and knitted fabric" Zimmer Austria [online], 1 page, Jun. 26, 2006.

"Digital Textile Broadcast," www.digital-textile.net [online] Issue 2, 20 pages, 2007.

"Hengelose revolutie in textieldruk," [Revolution in textile printing from Hengelo] Tubantia, 10 pages, Apr. 27, 2005 [includes English translation].

"Osiris Digital Prints: Continuous flow inkjet," Osiris Digital Prints [online]. Retrieved from the Internet: <URL:www.osirisdigitalprints.nl/index.php?lang=en&page-cotinuousflowinkjet>, 1 page, archived Jul. 13, 2009.

(Continued)

*Primary Examiner* — Amina S Khan

(74) *Attorney, Agent, or Firm* — Fish & Richardson P.C.

(57) ABSTRACT

A method of digital printing and finishing for fabrics is provided. The method includes a step of unwinding a fabric from a first reel. A step of compensating the speeds and of spreading the fabric for its positioning on a conveyor belt provided with supporting elements on which a digital printing step occurs is provided. A step of drying the fabric is provided. A step of winding the fabric onto a second reel is provided. These steps are being executed at corresponding stations arranged in sequence with respect to each other and the fabric passing through them continuously, transversely to the conveyor belt, there being a plurality of bars provided with printing heads which are controlled electronically and synchronized with the movement of the conveyor belt.

18 Claims, 3 Drawing Sheets

(56) References Cited

FOREIGN PATENT DOCUMENTS

| | | | |
|---|---|---|---|
| BR | 112013012860 | 9/2017 | |
| BR | 112013012863 | 10/2017 | |
| BR | 112013012725 | 1/2018 | |
| BR | 112013012750 | 5/2018 | |
| BR | 112013012755 | 7/2018 | |
| CA | 2818685 | 8/2018 | |
| CN | 1194208 | * 9/1998 | ............ B41J 3/4078 |
| CN | 1377313 | 10/2002 | |
| CN | 2537644 | 2/2003 | |
| CN | 1449331 | 10/2003 | |
| CN | 1593914 | 3/2005 | |
| CN | 1628981 | 6/2005 | |
| CN | 1672003 | 9/2005 | |
| CN | 1746028 | 3/2006 | |
| CN | 1764754 | 4/2006 | |
| CN | 1768117 | 5/2006 | |
| CN | 100395111 | 6/2008 | |
| CN | 101289147 | 10/2008 | |
| CN | 201436079 | 4/2010 | |
| CN | 101791900 | * 8/2010 | ........... B41J 3/4078 |
| CN | 109016843 | 12/2018 | |
| EP | 0522640 | 3/1995 | |
| EP | 0666180 | 8/1995 | |
| EP | 1034933 | 9/2000 | |
| EP | 1675995 | 9/2003 | |
| EP | 1591257 | 11/2005 | |
| EP | 1591258 | 12/2006 | |
| EP | 2240327 | 10/2010 | |
| GB | 1354890 | 5/1974 | |
| IT | 1402897 | 9/2013 | |
| JP | H08-302576 | 11/1996 | |
| JP | H08-311782 | 11/1996 | |
| JP | H08311782 | * 11/1996 | ................ B41J 2/01 |
| JP | H09-239968 | 9/1997 | |
| JP | H09-254366 | 9/1997 | |
| JP | 2002-088665 | 3/2002 | |
| JP | 2002-294547 | 10/2002 | |
| JP | 2004017458 | * 1/2004 | |
| JP | 2004-162247 | 6/2004 | |
| JP | 2005-199696 | 7/2005 | |
| JP | 2006-199498 | 8/2006 | |
| JP | 2007-046209 | 2/2007 | |
| JP | 2007-320278 | 12/2007 | |
| JP | 2008-168629 | 7/2008 | |
| JP | 2010-255133 | 11/2010 | |
| JP | 6087832 B | 3/2017 | |
| NL | 2002534 | * 12/2009 | ............ B41J 3/4078 |
| WO | WO2005028731 | 3/2005 | |
| WO | WO2006053074 | 5/2006 | |
| WO | WO 2009056641 | 5/2009 | |
| WO | WO2009102208 | 8/2009 | |
| WO | WO 2010124969 | 11/2010 | |
| WO | WO2012069242 | 5/2013 | |

OTHER PUBLICATIONS

"Osiris Digital Prints: International Partnership," Osiris Digital Prints [online]. Retrieved from the Internet: <URL:www.osirisdigitalprints.nl/index.php?lang=en&page=internationalpartnership>, 1 page, archived Jul. 13, 2009.

"Osiris Digital Prints: ISIS on Youtube," Osiris Digital Prints [online]. Retrieved from the Internet: <URL:www.osirisdigitalprints.nl/index.php?lang=en&page=isisonyoutube>, 1 page, archived Jul. 13, 2009.

"Osiris Digital Prints: ISIS Specifications," Osiris Digital Prints [online]. Retrieved from the Internet: <URL:www.osirisdigitalprints.nl/index.php?lang=en&page=isisspecifications>, 2 pages, archived Jul. 13, 2009.

"Osiris Digital Prints: Respecting printers skills," Osiris Digital Prints [online]. Retrieved from the Internet: <URL:www.osirisdigitalprints.nl/index.php?lang=en&page=respectingprintersskills>, 2 pages, archived Jul. 13, 2009.

Affidavit signed by Robin van Kleeff and relative attachments, 26 pages, Mar. 4, 2016.

Annex 1 to the statement of Mr. Jeroen van der Graaf, 7 pages, Feb. 2016.

Annex 2 to the Statement of Mr. Jeroen van der Graaf, 7 pages.

As per brief ex art. 183 of the Code of Civil Procedure, Court of Milan, Dover Europe sàrl and MS Printing Solutions S.r.l. v. SPGPrints B.V, Feb. 15, 2016, 43 pages, with English translation.

Bartelink et al., "Basiscursus Textielveredelen," Chapters 8-10, 35 pages, Jan. 2000.

BR Office Action in Brazilian Patent Appln No. BR112013012608-6, dated Jul. 28, 2020, 5 pages.

Brief Pursuant to Article 183, section 6, N. 3 of the Italian Code of Civil Procedure, Mar. 7, 2016, 19 pages [English].

Byrne, "The Potential for Digital Printing of Textiles," Web Consulting Ltd., 92 pages, Jul. 2003.

Chinese Office Action CN Patent Publication No. 201180056317.1; dated Sep. 3, 2014; 8 pages.

CN Office Action in Chinese Appln. No. 201810750581.9, dated Aug. 11, 2020, 24 pages (with English Translation).

CN Office Action in Chinese Appln. No. 201810750581.9, dated Oct. 22, 2019, 16 pages (with English Translation).

Decision to grant a European patent for EP 11 763 733.0 dated Apr. 1, 2016, 2 pages.

English Translation of Chinese Office Action CN Patent Publication No. 201180056317.1; dated Sep. 3, 2014; 3 pages.

EP Opposition "Interlocutory decision in opposition proceedings" in European Appln. No. 11763733.0, dated Dec. 12, 2018.

EP Opposition "Statement of Grounds of Appeal" in European Appln. No. 11763733.0, dated May 21, 2019, 19 pages.

EP Opposition, H.W. Prins and Annexes, Expert report Osiris Machine, in European Appln No. EP2643159, dated May 31, 2018, 16 pages.

EP Opposition, Circuit diagram, p. 34, Zugwalzenantrieb Dockenarm, in European Appln No. EP2643159, dated Nov. 4, 2004, 4 pages.

EP Opposition, "Declaration of Adi B. Chehna," dated Jun. 15, 2017, 3 pages.

EP Opposition, "Declaration of Adi B. Chehna," dated Mar. 27, 2018, 10 pages.

EP Opposition, "Declaration of Mr. H. J. van Wezel, " in European Appln No. EP2643159, dated Jun. 1, 2018, 1 page.

EP Opposition, "Declaration of Mr. H. J. van Wezel," in European Appln No. EP2643159, dated Jan. 24, 2016, 1 page.

EP Opposition, "Der Wareneinlauf FDM/51, Zimmer Austria," construction drawings, in European Appln No. EP2643159, dated Jan. 2005, 47 pages.

EP Opposition, "Dover 2015 Annual Report," in European Appln No. EP2643159, year 2015, 2 pages.

EP Opposition, Dover Invests in Digital Textile Printing by Ron Gilboa, in European Appln No. EP2643159, dated Feb. 12, 2014, 1 page.

EP Opposition, "Notice of Opposition," Giambroncono, in European Appln No. EP2643159, dated Jan. 27, 2017, 18 pages.

EP Opposition, "Notice of Opposition," Opposition by Xennia Holland b.v., in European Appln No. EP2643159, dated Jan. 27, 2017, 7 pages.

EP Opposition, "Operating and Maintenance Instructions, CFIJ printer (or Osiris printer), by ATG Safety &Training BV," in European Appln No. EP2643159, dated Mar. 2009, 106 pages.

EP Opposition, Annex A of Textile Tech Services, in European Appln No. EP2643159, year 1983, 6 pages.

EP Opposition, Annex B of AATCC Technical Manual, vol. 85, in European Appln No. EP2643159, year 2010, 6 pages.

EP Opposition, CV Hans Prins, in European Appln No. EP2643159, year 2017, 1 page.

EP Opposition, Preliminary opinion of opposition division in European Appln No. EP2643159, dated Feb. 16, 2018, 19 pages.

EP Opposition, Proprietor's Counterstatement to Notices of Opposition, Opposed European Patent No. EP264315981, dated Nov. 10, 2017, 51 pages.

EP Opposition, Submission in Opposition Proceedings, in European Appln No. EP2643159, dated Sep. 13, 2018, 7 pages.

(56) References Cited

OTHER PUBLICATIONS

EP Opposition, Written Submissions and Amendments, in European Appln No. EP2643159, dated Aug. 28, 2018, 42 pages.
EPO Communication Pursuant to Article 94(3) EPC in Appln. No. 16166950.2, dated Apr. 29, 2020, 4 pages.
European Intention to Grant for Application No. 11763733.0, dated Feb. 23, 2016, 18 pages.
European opposition for EP11763733.0 dated Jun. 22, 2016, 79 pages.
European Communication pursuant to Article 94(3) and Rule 71(1) EPC, for EP 11 763 733.0 dated Jun. 23, 2015, 4 pages.
European Communication pursuant to Article 94(3) EPC, for EP 11 763 733.0 dated May 18, 2015, 3 pages.
International Search Report and Written Opinion for PCT/EP2011/067162 mailed Dec. 19, 2011, 10 pages.
Fourth Chinese Office Action (w/English Translation) for 201180056317.1 dated Apr. 6, 2016, 15 pages.
Second Chinese Office Action (w/English Translation) for 201180056317.1 dated May 6, 2015, 9 pages.
Third Chinese Office Action (w/English Translation) for 201180056317.1 dated Oct. 10, 2015, 13 pages.
Final Rejection in U.S. Appl. No. 13/988,108, 12 pages, Jun. 19, 2015.
Google screen stating the date of the presentation of the Vince Cahill entitled Digital Textile Printing 2004, 1 page.
IN Office Action issued in Indian Application No. 1475/KOLNP/2013, dated Dec. 20, 2018, 9 pages.
ISIS by Osiris, Flickr [online], 96 pages, 2009.
IT Litigation, *MS Printing Solutions S.r.l. and Dover Europe S.a.r.l.* v. *SPG Prints,* First Brief ex art. 183 (VI) n. 1 c.p.c. on behalf of the defendants Dover Europe s.àr.l., e MS Printing Solutions s.r.l., dated Jan. 15, 2016, 3 pages.
IT Litigation, *SPG Prints* v. *MS Printing Solutions S.r.l. and Dover Europe S.a.r.l.,* "Brief Pursuant to Article 183, Section 6 N° 2 of the Italian Code of Civil Procedure," dated Dec. 12, 2016, 25 pages.
IT Litigation, *SPG Prints* v. *MS Printing Solutions S.r.l. and Dover Europe S.a.r.l.,* "Brief Pursuant to Article 183, Section 6 N° 3 of the Italian Code of Civil Procedure," dated Mar. 7, 2016, 17 pages.
IT Litigation, *SPG Prints* v. *MS Printing Solutions S.r.l. and Dover Europe S.a.r.l.,* "Court-Appointed Expert Report First Technical Brief in Favour of the Defendants," dated Jul. 29, 2016, 24 pages.
IT Litigation, *SPG Prints* v. *MS Printing Solutions S.r.l. and Dover Europe S.a.r.l.,* "Expert Technical Report: Second Technical Brief on Behalf of the Defendants," dated Oct. 10, 2016, 48 pages.
IT Litigation, *SPG Prints* v. *MS Printing Solutions S.r.l. and Dover Europe S.a.r.l.,* "First Technical Brief on Behalf of the Plaintiff SPGPrints B.V.," dated Jul. 29, 2016, 83 pages.
IT Litigation, *SPG Prints* v. *MS Printing Solutions S.r.l. and Dover Europe S.a.r.l.,* "Specialised section for business matters—Section A, Dott. Pierluigi Perrotti, In the civil action R.G. 45890/2015" dated Feb. 15, 2019, 125 pages.
IT Litigation, *SPGPRints* v. *MS Printing Solutions S.r.l and Dover Europe S.a.r.l,* "Sezione specializzata in materia d'impresa—Sez. A, Dott. Pierluigi Perrotti, Nella causa civile R.G. 45890/2015" dated Feb. 15, 2019, 125 pages.
IT Litigation, *SPGPRints* v. *MS Printing Solutions S.r.l and Dover Europe S.a.r.l,* Specialised section for business matters—Section A, Dott. Pierluigi Perrotti, In the civil action R.G. 45890/2015, dated Feb. 15, 2019, 125 pages {Human translation}.
Italian Search Report dated Aug. 2, 2011 for MI2010A002176 filed Nov. 24, 2010, pp. 1-2.
Japanese First Office Action (w/English Translation) for 2013-540276 dated Jun. 2, 2015, 7 pages.
King, "Emerging Technologies for Digital Textile Printing," AATCC Review, pp. 34-36, Aug. 2009.
Malik et al., "Advances in ink-jet printing technology of textiles" Indian Journal of Fibre & Textile Research, vol. 30, Mar. 2005, pp. 99-113, Mar. 2005.
Miles, Ed., "Textile Printing," revised second edition, Society of Dyers and Colourists, pp. 1-57, 275-330, 2003.
Ministry of Economic Development Italian Patent and Trademark Office Bibliographic Info for Italian Patent No. 1402897, issued Sep. 27, 2013, 2 pages.
Minutes, Court of Milan, Commercial Chamber, *Dover Europe sàrl and MS Printing Solutions S.r.l.* v. *SPGPrints B.V,* 10 pages, Apr. 6, 2016 [includes English translation].
Moser, "ITMA 2003 Review: Textile Printing," Journal of Textile and Apparel, Technology and Management, vol. 3, issue 3, 15 pages, Fall 2003.
NL Litigation, "Agreement for the Supply of Machinery," Purchase Agreement, in European Appln No. EP2643159, dated Aug. 20, 2008, 21 pages.
NL Litigation, "Dover Annual Report," year 2007, 4 pages.
NL Litigation, "Statement of Ger Brinks Gerrit Bouwhuis and Jenk Gooijer," dated Mar. 2017, 7 pages.
NL Litigation, "Statement of Martin Smallengange," dated Mar. 29, 2017, 5 pages.
NL Litigation, Stork Prints Group Unveils Successor to the World-Reowened Pegasus CC, Plus Unrivalled Range of Consumables and Equipment, at the ITMA Asia 2010, SPGPrints, year 2010, 2 pages.
NL Litigation, "Th8 Manufacturing License Agreement," in European Appln No. EP2643159, dated Feb. 25, 2009, 2 pages.
NL Litigation, Moser, JTATM: Journal of Textile and Apparel. Technology and Management, NC State University, vol. 3 Issue 3, year 2003, 15 pages.
NL Litigation, Original Judgment Court The Hague, in European Appln No. EP2643159, dated Sep. 13, 2017, 19 pages.
NL Litigation, PN Staff, "Dover merges Markem and Imaje," PackagingNews, dated Nov. 22, 2017, 3 pages.
NL Litigation, Rouette, Prof. Dr. rer. Nat. Hans-Karl, "Encyclopedia of Textile Finishing," in European Appln No. EP2643159, year 2001, 7 pages.
NL Litigation, SGS Inspection Report, in European Appln No. EP2643159, dated Jan. 22, 2010, 13 pages.
Numtex: Digital Textile Printing Forum, retrieved from the Internet: <URL:http://www.numtex.com/directnews/rubriques/?noRubrique=10>, 2 pages, archived May 15, 2006.
Office Action in Brazilian Application No. 2013-012608, mailed Dec. 26, 2018, 2 pages.
Office Action in Brazilian Application No. 2013-2013-012608, mailed Jul. 2, 2019, 5 pages (English translation).
Office Action in Canadian Application No. 2,818,685, dated Jul. 4, 2017, 3 pages.
Office Action in Chinese Application No. 201180056317, dated Nov. 30, 2016, 16 pages (with English translation).
Office Action in Chinese Application No. 201180056317.1, dated Oct. 25, 2017, 17 pages (with English transaltion).
Office Action in Japanese Application No. 2013-540276, mailed May 31, 2016, 6 pages.
Office Action in Japanese Application No. 2017-017561, dated Nov. 14, 2017, 11 pages (with English translation).
Office Action in Korean Application No. 10-2013-7015824, dated Jan. 31, 2017, 7 pages (with English translation).
Presentation made by Circatex, "Massively Integrated Inkjet Printing for Electronics Applications," 48 pages, Nov. 2, 2005.
Presentation made by Darrel Whiteside of MAGPOWER "Understanding Dancer Tension Control Systems," 2010 PLACE Conference, Albuquerque, New Mexico, 5 pages, 2010.
Presentation made by Hewlett-Packard, "The ABC's of HP's SPT (Scalable Printing Technology)," IMI 13th Annual European Inkjet Conference, 46 pages, Nov. 8, 2005.
Presentation made by Konica Minolta, "Inkjet Textile Printing, History—Today—Tomorrow, Keys for Success to be real industry," IMI 13th Annual European Inkjet Conference, 19 pages, Nov. 9, 2005.
Presentation made by Olympus, "Ink jet print head bars for industrial applications," 13th Annual European Ink Jet Printing Conference, 50 pages, Nov. 9, 2005.
Presentation made by SunJet, "The Challenges of Ink Jet Ink Formulation for Packaging, " IMI 13th Annual European Ink Jet Printing Conference, 61 pages, Nov. 8-10, 2005.

(56) References Cited

OTHER PUBLICATIONS

Presentation made by Vince Cahill of VCE Solutions, "Digital Textile Printing 2004," NIP20: International Conference on Digital Printing Technologies, Salt Lake City, Utah, 42 pages, Oct. 2004.
Presentation made by Xaar, "Radical Developments in Ink Jet Design," IMI 13th Annual European Inkjet Conference, 26 pages, 2005.
Roisum, The Mechanics of Web Handling, Chpt. 4-7, pp. 49-98, copyright 1998.
Second Presentation made by Konica Minolta, IMI 13th Annual European Ink Jet Printing Conference, 14 pages, Nov. 8-10, 2005.
SPGPrints® RD 8 rotary machine brochure, 8 pages, Jul. 11, 2008.
Statement of Germani Primi, 1 page, Feb. 8, 2016.
Statement of Jos Notermans, 2 pages, Feb. 12, 2016.
Statement of Mr. Jeroen van der Graaf, 7 pages, Feb. 11, 2016.
Statement of Rinaldo Ginelli, 2 pages, Feb. 1, 2016.
Stork Prints, "New Pegasus Printing System & Hotmelt screen coating unit," Pakistan Textile Journal, 2 pages, May 2005.
Stork® Pegasus rotary machine brochure, 12 pages, Apr. 6, 2004.
Stork® Print system RD 8, retrieved from the Internet: <URL:http://www.storkprints.com/page.html?ch=DEF&id=208>, 1 page, archived Oct. 13, 2007.
Writ of Summons, Court of Milan, Commercial Chamber, *Dover Europe sàrl and MS Printing Solutions S.r.l.* v. *SPGPrints B.V,* Jul. 14, 2015, 77 pages [includes English translation].
Written Opinion dated Nov. 15, 2011 for MI2010A002176 filed Nov. 24, 2010, 9 pages.
Office Action in Chinese Appln. No. 201810750581.9, dated Jan. 20, 2023, 21 pages, (with English translation).
Office Action in Chinese Appln. No. 201810750581.9, dated Aug. 3, 2023, 2023, 36 pages (with English translation).
Romano, "Inkjet Printing," Inkjet History, Technology, Markets and Applications (Chinese Edition), 1st edition, Aug. 2010, pp. 50, 84-86 and 101-102 (with English translation).

* cited by examiner

DIGITAL PRINTING AND FINISHING METHOD FOR FABRICS AND THE LIKE

CROSS-REFERENCE TO RELATED APPLICATIONS

This application is a continuation of U.S. patent application Ser. No. 15/214,037 filed on Jul. 19, 2016 now abandoned, which is a continuation of U.S. patent application Ser. No. 13/988,108 filed on May 17, 2013 now abandoned, which is a U.S. national phase of PCT Application No. PCT/EP2011/067162 filed on Sep. 30, 2011, which claims priority to Italian Application No. MI2010A002176, filed Nov. 24, 2010, the disclosures of which are incorporated in their entirety by reference herein.

TECHNICAL FIELD

The present invention relates to a digital printing and finishing method for fabrics and the like.

BACKGROUND ART

The conventional method of digital printing and finishing for fabrics, starting with a fabric for conventional printing that has previously been rendered hydrophilic in order to allow the penetration of conventional printing pastes, is made up of a sequence of steps that are executed independently of each other.

More precisely, this sequence consists in a step of preparing the fabric for digital printing, in which the fabric for conventional printing is impregnated with adapted substances in order to enable the fixing of the color in order to subsequently be dried, a printing step, in which the fabric is printed and dried, a steaming step, in which the fabric is placed in a steaming chamber for a period that can vary from ten to thirty minutes according to the type of fabric and to the type of printing ink used, a washing step, in which the fabric is washed to remove excess quantities of ink, and a drying step, in which the fabric is dried.

This conventional method suffers the drawback of displaying limited productivity because of the fact that the individual steps occur independently of each other.

In order to speed up the method of printing, a known technique is to have the washing and drying steps occur continuously. This attempt at speeding the method up is however not sufficient to adequately reduce the processing times.

DISCLOSURE OF THE INVENTION

The aim of the present invention consists in providing a method of digital printing and finishing for fabrics that is faster than the conventional method of digital printing and finishing, while increasing the productivity of the system.

Within this aim, an object of the present invention consists in providing a method of digital printing and finishing for fabrics that is simple and effective, while at the same time ensuring low costs of implementing the system and production costs that are economically advantageous when compared to those of the known art.

Another object of the present invention is to provide a method of digital printing and finishing for fabrics that limits manual intervention from the operator as far as possible.

Another object of the present invention is to provide a method of digital printing and finishing for fabrics that, thanks to its peculiar implementation characteristics, is capable of offering the widest guarantees of reliability and safety in use.

This aim and these and other objects which will become better apparent hereinafter, are achieved by a method for printing and finishing for fabrics and the like, characterized in that it comprises a step of unwinding a fabric from a first reel, a step of compensating the speeds and of spreading said fabric in order to position it on a conveyor belt provided with supporting means on which a digital printing step occurs, followed by a step of drying said fabric and a step of winding said fabric onto a second reel, said steps being performed in corresponding stations arranged in sequence with respect to each other and said fabric passing through said stations continuously, transversely to said conveyor belt there being a plurality of bars provided with printing heads which are controlled electronically and synchronized with the movement of said conveyor belt.

BRIEF DESCRIPTION OF THE DRAWINGS

Further characteristics and advantages of the invention will become better apparent from the detailed description of two preferred, but not exclusive, embodiments of a method of printing and finishing for fabrics and the like, which are illustrated by way of non-limiting example in the accompanying drawings, wherein.

WAYS OF CARRYING OUT THE INVENTION

Figure 1:
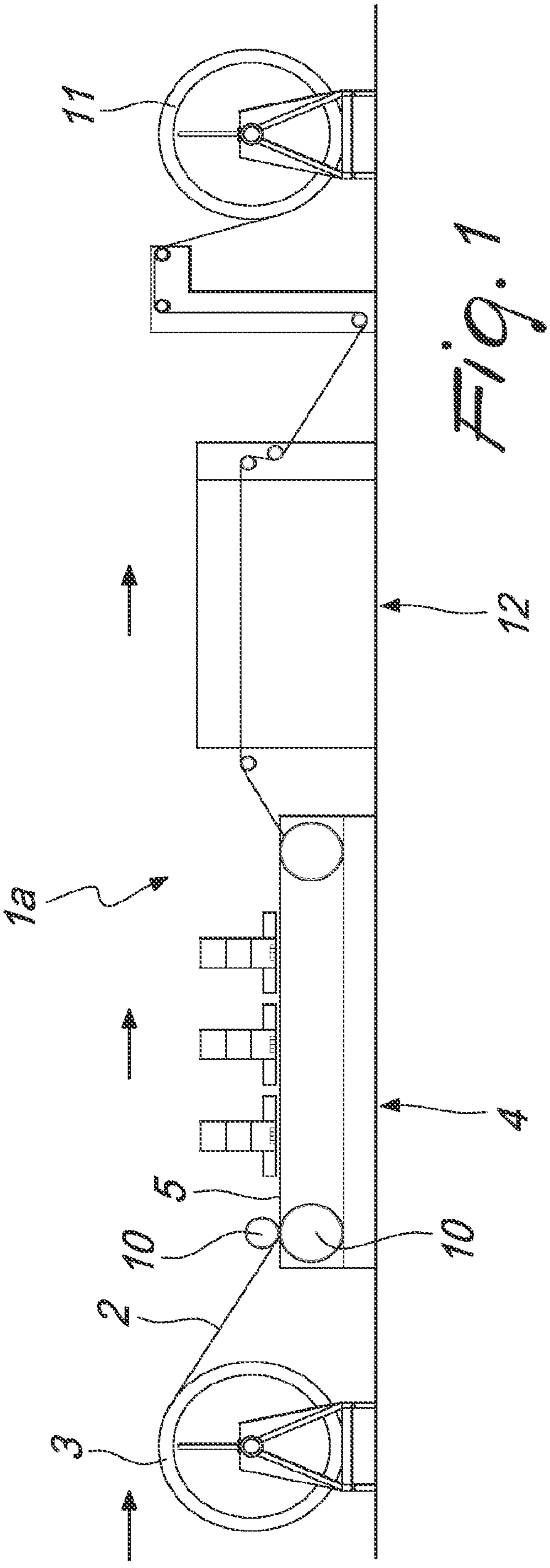
FIG. 1 is a schematic side elevation view of a system according to a first embodiment of a method of printing and finishing for fabrics and the like, according to the present invention.

With reference to the figures, the first embodiment of the method of printing and finishing for fabrics and the like, according to the invention, is performed by a system, generally designated in FIG. 1 by the reference numeral 1*a*, and comprises a step of unwinding a fabric 2 from a first reel 3, a step of compensating the speeds and of spreading the fabric 2 in an adapted station 4 for positioning it on a conveyor belt 5 provided with supporting means, for example of the adhesive type, on which a digital printing step occurs.

Advantageously, transversely to the conveyor belt 5, there is a plurality of bars 6 provided with printing heads 7 which are controlled electronically and synchronized with the movement of the conveyor belt 5.

More precisely, the printing heads 7 are of the piezoelectric ink jet type and are positioned on each one of the bars 6 in such a manner as to cover the width of the conveyor belt 5 and allow continuous printing.

Subsequently a step of drying the fabric 2 and a step of winding it onto a second reel 11 are provided. This drying step can occur with hot air in a steaming chamber 12 or the like.

Figure 4:
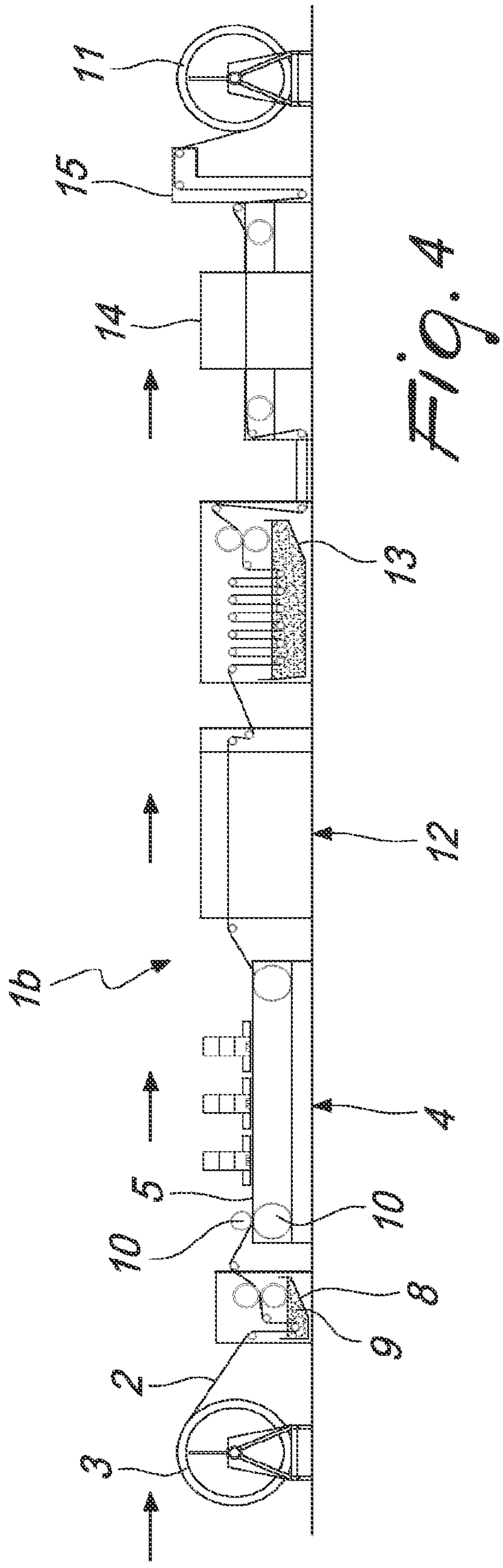
FIG. 4 is a schematic side elevation view of a system according to a second embodiment of a method of printing and finishing for fabrics and the like, according to the present invention.
Figure 2:
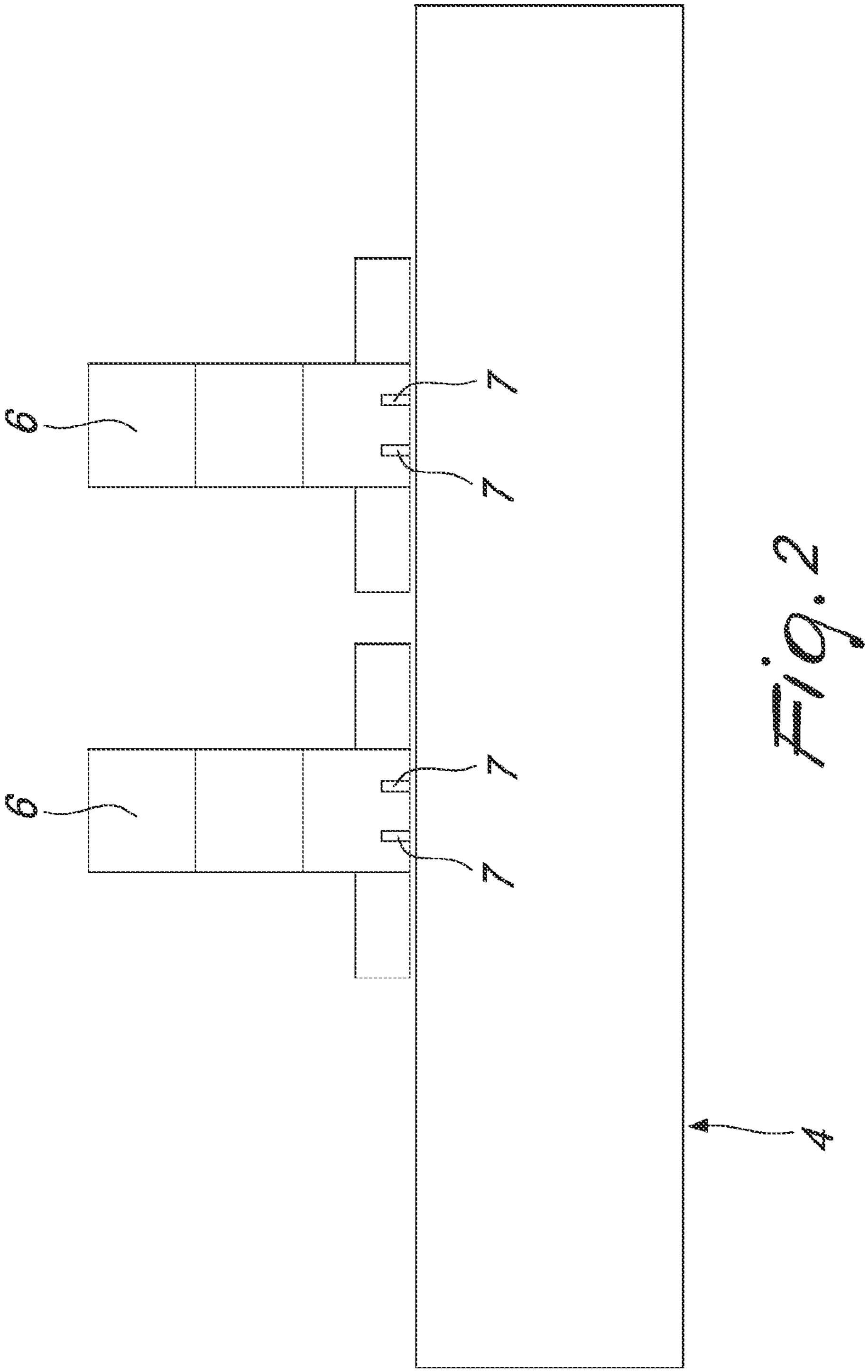
FIG. 2 is an enlarged-scale detailed view of the station corresponding to the printing step of the system shown in FIG. 1.
Figure 3:
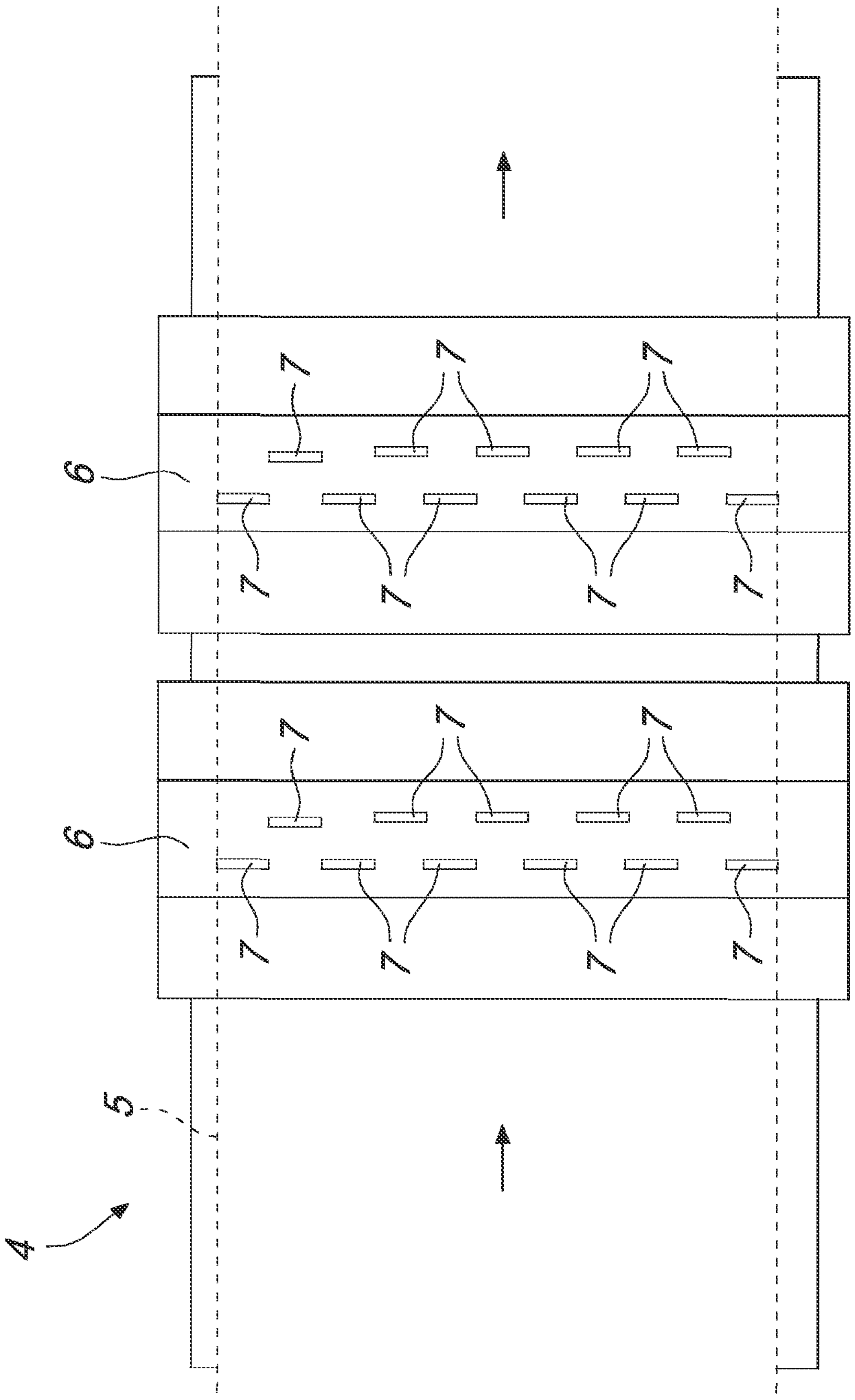
FIG. 3 is a schematic plan view from above of the station shown in FIG. 2.

Differently, in the second embodiment, for which the corresponding system 1*b* is shown in FIG. 4 between the unwinding station and the printing station a step can be provided of immersion of the fabric 2 unwound from the first reel 3 in a tank 8 containing an aqueous solution 9 comprising at least one or more substances selected from the group constituted by pH stabilization compounds and salts adapted to facilitate the fixing of the ink on the fabric 2 in the subsequent steaming step described below.

Conveniently, following the above mentioned immersion, a step is provided of pressing the fabric 2 impregnated with the aqueous solution 9 through a pair of presser rollers 10 in such a manner as to eliminate the excess part of the aqueous solution 9 from the fibers of the fabric 2.

Following the digital printing step, a step is provided of steaming the fabric 2 printed and impregnated with the aqueous solution 9 through a steaming chamber 12 in such a manner as to fix the ink to the fabric 2.

In this step, the fabric 2 retains a level of humidity similar to that of the previous steps and, given the speed at which this step occurs, which is comprised between 1 and 100 meters per minute, is such as to accelerate the process of penetration of the color into the fibers of the fabric 2.

Moreover, thanks to a steam temperature that is adapted to the process under conditions of atmospheric pressure, it is sufficient for the fabric 2 to remain in the steaming chamber 12 for 10 to 40 seconds in order to obtain the required fixing.

Conveniently, the steaming chamber 12 is dimensioned as a function of the top speed of the printing step, so as to ensure that the fabric 2 remains inside the steaming chamber 12 for a sufficient time.

Thereafter, a step can be provided of washing the printed and steamed fabric 2 which is adapted to eliminate from the fabric 2 the excess part of the ink by means of immersion in an adapted tank 13.

The fabric 2 is then dried and brought back to its initial size through two adapted machines 14 and 15 or it is simply dried and subsequently rewound onto the reel 11.

To sum up, in both of the proposed embodiments, the method according to the invention comprises a sequence of steps performed in corresponding stations arranged in sequence with respect to each other with the fabric 2 passing through all of them continuously.

More precisely, with regard to the first embodiment, the continuous method of digital printing and finishing, according to the invention, is adapted, for example, to fabrics printed with acid or disperse inks and, with regard to the second embodiment, the continuous method of digital printing and finishing, according to the invention, is adapted, for example, to fabrics printed with reactive inks such as monochloro/dichloro triazine and vinyl sulfone.

In practice it has been found that the method of digital printing and finishing for fabrics and the like, according to the present invention, achieves the intended aim and objects in that it is much faster than the conventional methods of digital printing.

Another advantage of the method, according to the present invention, consists in that it enables an energy saving as a result of the reduction of the number of drying processes and the reduction of the evaporation time.

A further advantage of the method, according to the present invention, consists in that, thanks to the continuity of the process, the movement is eliminated of the fabric between the several necessary steps to obtain the required product.

The method of printing and finishing for fabrics and the like thus conceived is susceptible of numerous modifications and variations, all of which are within the scope of the appended claims.

For example, instead of having the fabric on reels both in input and in output, it can be arranged in sheets.

Moreover, all the details may be substituted by other, technically equivalent elements.

In practice the materials employed, provided they are compatible with the specific use, and the contingent dimensions and shapes, may be any according to requirements.

The disclosures in Italian Patent Application No. MI2010A002176 from which this application claims priority are incorporated herein by reference.

The invention claimed is:

1. A method of digital printing fabrics, the method comprising:

supplying a fabric from a first reel by unwinding, applying an ink-fixing solution to the supplied fabric, compensating a speed of a conveyor belt with a speed of the fabric unwound from the first reel;

adhering the fabric to the conveyor belt, with the fabric adhered to the conveyor belt, digitally printing an ink onto the fabric using a plurality of bars transversally extending above the conveyor belt and provided with ink-jet printing heads, while continuously moving the conveyor belt and electronically controlling the printing heads and synchronizing the printing heads with movement of the conveyor belt, thereby allowing continuous printing, drying the fabric, and then winding the dried fabric onto a second reel or arranging the dried fabric in sheets;

wherein the above steps are performed in corresponding stations arranged in sequence while the fabric is continuously passing through the stations.

2. The method of claim 1, wherein applying the ink-fixing solution comprises impregnating with the ink-fixing solution fibers of fabric unwound from the first reel before the unwound fabric reaches the conveyor belt.

3. The method of claim 2, wherein the step of digitally printing comprises digitally printing fibers of the fabric impregnated with the ink-fixing solution.

4. The method of claim 3, wherein applying the ink-fixing solution comprises immersing fabric unwound from the first reel in a tank containing the ink-fixing solution.

5. The method of claim 1, further comprising eliminating excess ink-fixing solution from the fibers of the fabric before digitally printing the fabric.

6. The method of claim 1, further comprising fixing the ink on the printed fabric between the digital printing and the drying.

7. The method of claim 6, fixing the ink comprises steaming the printed fabric in a steaming chamber.

8. The method of claim 7, comprising a step of washing said printed and steamed fabric to eliminate from said fabric excess part of said ink, said washing step being comprised between said steaming step and said drying step.

9. The method of claim 7, wherein steaming the printed fabric comprises keeping the steaming chamber at atmospheric pressure conditions and maintaining the fabric in the steaming chamber for 10 to 40 seconds.

10. The method of claim 6, further comprising washing the printed fabric to remove excess ink between the ink fixing and the drying.

11. The method of claim 1, wherein applying the ink-fixing solution to the fabric occurs between the unwinding and the speed compensation.

12. The method of claim 1, wherein adhering the fabric to the conveyor belt comprises adhesively adhering the fabric to the conveyor belt.

13. The method of claim 1, wherein the printing heads are arranged on each one of said bars in such a manner as to cover the width of said conveyor belt.

14. The method of claim 1, wherein the ink-fixing solution is an aqueous ink-fixing solution.

15. The method of claim 14, wherein the aqueous ink-fixing solution comprises pH stabilization compounds pH stabilization salts or mixtures thereof.

16. The method of claim 1, wherein digitally printing the fabric comprises applying reactive inks.

17. A method of digital printing fabrics, the method comprising:

supplying a fabric from a first reel by unwinding, applying an ink-fixing solution comprising a pH stabilizer to the fabric by impregnating, compensating a speed of a conveyor belt with a speed of the fabric unwound from the first reel;

adhering the fabric to the conveyor belt, while the fabric is adhered to the conveyor belt, digitally printing the adhered fabric using a plurality of bars transversally extending above the conveyor belt and provided with ink-jet printing heads while continuously moving the conveyor belt and electronically controlling the printing heads and synchronizing the printing heads with movement of the conveyor belt, wherein the digitally printing includes digitally printing fibers of the fabric impregnated with the ink fixing solution with reactive ink, steaming the printed fabric through a steaming chamber to fix the ink to the fabric, drying the steamed fabric, and winding the dried fabric onto a second reel or arranging the dried fabric in sheets;

wherein the above steps are performed in corresponding stations arranged in sequence while the fabric is continuously passing through the stations.

18. A method of digital printing fabrics comprising the following sequence of steps:

supplying a fabric from a first reel by unwinding, applying an aqueous ink-fixing solution comprising a pH stabilizer to the fabric by impregnating, compensating a speed of a conveyor belt with a speed of the fabric unwound from the first reel;

adhering the fabric to the conveyor belt, while the fabric is adhered to the conveyor belt, digitally printing the fabric using a plurality of bars transversally extending above the conveyor belt and provided with ink-jet printing heads while continuously moving the conveyor belt and electronically controlling the printing heads and synchronizing the printing heads with movement of the conveyor belt, wherein the digitally printing includes digitally printing fibers of the fabric impregnated with the ink fixing solution with reactive ink, drying the printed fabric, and winding the dried fabric onto a second reel or arranging the dried fabric in sheets;

wherein the above steps are performed in corresponding stations arranged in sequence while the fabric is continuously passing through the stations.

* * * * *